United States Patent [19]
Cockrell, Sr. et al.

[11] Patent Number: 5,401,288
[45] Date of Patent: Mar. 28, 1995

[54] DEFLECTOR PLATE SUPPORT

[76] Inventors: Larry R. Cockrell, Sr., 460 N. Trevor, Antioch, Ill. 60002; Ronald D. Jackson, Sr., 2516 Jethro Ave., Zion, Ill. 60099

[21] Appl. No.: 160,478
[22] Filed: Dec. 1, 1993
[51] Int. Cl.⁶ ............................................. C03B 7/14
[52] U.S. Cl. ........................................ 65/165; 65/172; 65/304; 65/374.15
[58] Field of Search ............ 65/165, 304, 225, 374.15, 65/172, 123

[56] References Cited

U.S. PATENT DOCUMENTS

| | | | |
|---|---|---|---|
| Re. 28,759 | 4/1976 | Bystrianyk | 65/304 |
| 2,106,545 | 1/1938 | Bates | 65/304 |
| 2,826,869 | 3/1958 | Lerch | 65/304 |
| 3,214,257 | 10/1965 | Faber | 65/304 |
| 3,893,835 | 7/1975 | Jones | 65/127 |
| 4,118,210 | 10/1978 | Watanabe et al. | |
| 4,504,301 | 3/1985 | Bystrianyk | 65/66 |
| 4,574,009 | 3/1986 | Welker | |
| 4,615,717 | 10/1986 | Neubauer et al. | |
| 4,692,375 | 9/1987 | Neubauer et al. | |
| 5,114,456 | 5/1992 | Weisenburger et al. | |

FOREIGN PATENT DOCUMENTS 274633 11/1988 Japan .................................. 65/225

OTHER PUBLICATIONS

Undated, two page "K-Karb ™ Bulletin" by Kaiser Aerotech.

Primary Examiner—W. Gary Jones
Assistant Examiner—John M. Hoffmann
Attorney, Agent, or Firm—James P. Hanrath

[57] ABSTRACT

A deflector plate support includes a support body having an integral frame-like construction and a first end portion and a second end portion each of which are connected to a perpendicularly disposed border that is connected to an inwardly extending wall disposed perpendicular to the border. Each end portion of the support body, each border, and each inwardly extending wall are joined to a base at a common end thereof to thereby define, in association with the support body, a slot for vertically or horizontally receiving, releasably retaining, and orientating the deflector plate such as to expose a front deflection surface or a plurality of front deflection surfaces of the deflection plate.

8 Claims, 2 Drawing Sheets

DEFLECTOR PLATE SUPPORT

BACKGROUND OF THE INVENTION

1. Field of the Invention

The present invention relates generally to a deflector plate support for receiving, releasably retaining, and properly orientating a deflector plate, relates particularly to a deflector plate support which is used in the processing of a stream of molten material, and relates even more particularly to a carbon deflector plate support which is used in the processing molten glass gobs.

2. Description of the Related Art Including Information Disclosed Under 37 CFR §1.97–1.99

Many glass making processes utilize a stream of molten glass wherein the stream is fed by gravity from an overhead former and feeder and then cut by shear blades into gobs such that the gobs can be gravity fed in a predetermined sequence to the central axis of a mold for the production of bottles and other glasswares. Modern glass container forming machines may have as many as ten independent sections with each section having multiple parison molds which receive such molten glass gobs.

During certain portions or cycles of the glassware or bottle production process, it is desirable to prevent the molten gobs from falling into the molds by deflecting the gobs into a collector for recycling to the molten glass stream. As the molten glass stream may range from 1,200° to 2,000° Fahrenheit, deflector plates are used to deflect molten gobs from the molds. In this regard, a deflector plate operatively connected to a clevis joined to a piston arm may move the plate's front deflecting surface to two positions with respect to a molten glass gob sheared from a molten glass stream: a first or open position wherein the front surface of the deflector plate is set parallel to the gravity fed path of the molten gob thereby allowing the gob to pass the plate and enter a mold for the forming of a bottle or glassware, or a interception position wherein the front deflection surface of the deflector plate is set at an angle, such as 45°, to the gravity fed path of the molten gob so as to deflect the molten gob away from the molds to a collector for recycling back into the molten stream. A deflector plate may have a deflection surface which interacts with one or more molten gob streams. Thus, an open position of the deflector plate allows one glass gob or multiple glass gobs to pass to the central axis of one mold or multiple molds, respectively, for the production of glassware but an interception position of the deflector plate prevents the molten glass from entering the mold or molds and recycles the same such that workmen may have access to the mold equipment for workpiece maintenance, adjustments, and repairs without shutting down the entire glass production line.

In glassware making processes, it is advantageous to have a deflector plate deflect molten glass gobs from a path intended for the molds to a recycling path for recycling to the molten glass stream such that molds can be changed to accommodate different job requirements or that maintenance, such as oiling of mold blanks, or other repairs can be made without shutting down the entire glass forming machinery for excessive periods of dead time.

Deflector plates (also referred to as interceptors, gob guides, ejectors, or flippers) when made of cast steel require water or air cooling to prevent the molten glass gob from sticking to the metal. In order to eliminate this necessity for water or air cooling, some deflector plates are made of carbon, such as the K Karb TM interceptor plate manufactured by Kaiser Aerotech of San Leandro, Calif. Such carbon deflector plates require the plate to be drilled so that screws may be inserted therethrough to connect the plate to a clevis joined to a piston arm for movement of the deflector plate assembly to its open and interception positions. The drilling of the carbon plate, as well as usage of the carbon plate in the extreme environment of molten glass streams, makes carbon deflector plates prone to cracking or breakage. Should the carbon deflector plate crack and break, either in full or in part, the plate may fail in its function to deflect a molten glass gob thereby presenting a significant safety hazard to workers charged with molten glass machinery maintenance, adjustments, and repairs. Additionally, replacement of broken carbon deflector plates necessitates significant expense to obtain new carbon deflector plates.

The deflector plate support of the present invention provides a support for a carbon deflector plate which eliminates the need to drill the carbon deflector plate and structurally reinforces the same to prevent cracking or breakage thereof so as to prolong its useful life and safeguard its function in controlling access of a molten glass gob to or away from the central axis of a mold.

SUMMARY OF THE INVENTION

According to the present invention there is provided a support for a deflector plate having a front deflection surface or multiple front deflection surfaces bordered by a first side edge and a second side edge wherein said support comprises a support body having an integral frame-like construction and a first end portion and a second end portion, means interconnected with the end portions of the support body structurally independent of the deflector plate and capable of partially enclosing the first side edge and the second side edge of the deflector plate for vertically or horizontally receiving, releasably retaining, and orientating the deflector plate to substantially expose its front deflection surface or surfaces, and means for mounting the support body to an operative flipper assembly.

Additional features and advantages of the present invention will become apparent to those skilled in the art from the following description and the accompanying figures illustrating the preferred embodiment of the invention, the same being the present best mode for carrying out the invention.

DESCRIPTION OF THE PREFERRED EMBODIMENTS

Figure 1:
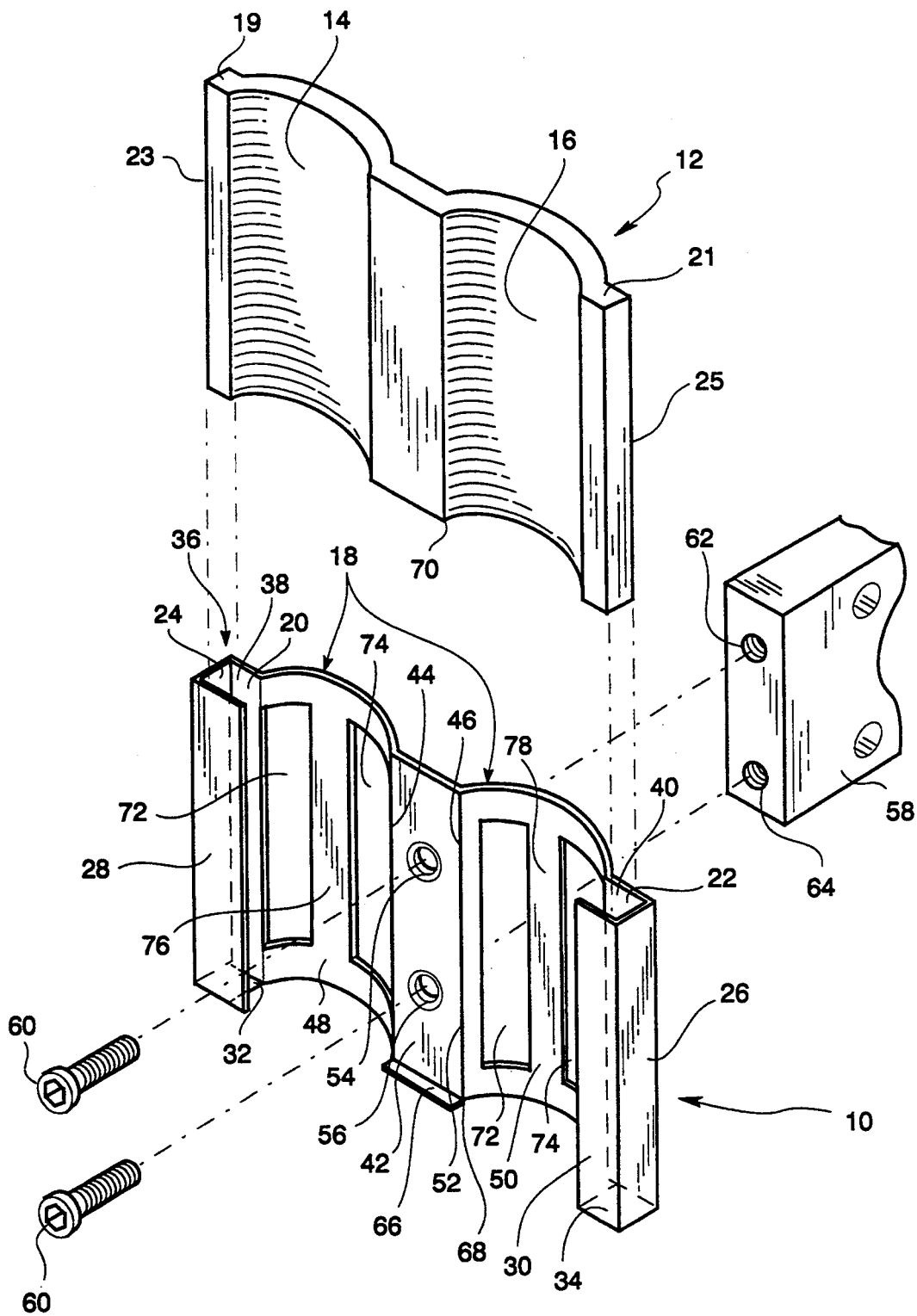
FIG. 1 is a front perspective view of a deflector plate support constructed according to the teachings of the present invention suitable for a double gob deflector plate.

Referring now to FIG. 1 there is shown therein a deflector plate support 10 suitable for the support of a double gob deflector plate 12.

The deflector plate 12 has two molten glass gob receiving front deflection surfaces 14 and 16. Deflector plate 12 is made of carbon so as to withstand the high temperatures as may be encountered from a glancing blow of a gob of molten glass at 1,000° F. to 2,000° F. without special water or air cooling to prevent molten glass gobs from sticking to front deflection surfaces 14 and 16.

The deflector plate support 10 of the present invention has an integral frame-like construction and consists of a support body 18 the lateral end portions 20 and 22 of which are interconnected with means for receiving, releasably retaining, and orientating deflector plate 12 such as to expose gob receiving front deflection surfaces 14 and 16.

The means for receiving, releasably retaining, and orientating the deflector plate 12 may include each of the lateral end portions 20 and 22 of support body 18 terminating into perpendicularly disposed borders 24 and 26 respectively. Borders 24 and 26 terminate into perpendicularly disposed inwardly extending walls 28 and 30 respectively. Lateral end portion 20, border 24, and inwardly extending wall 28 are joined to a base 32 at their lower ends. Likewise, lateral end portion 22, border 28, and inwardly extending wall 30 also have a base 34 at their lower ends. Each lateral end portion, border, inwardly extending wall, and base formation defines, in association with support body 18, a slot 36 for vertically receiving, releasably retaining, and properly orientating deflector plate 12.

As shown at FIG. 1, support body 18 is cooperatively dimensioned with respect to deflector plate 12 such that trough-like vertical slot ends 38 and 40 of slot 36 are spaced from each other a distance corresponding to end portions 19 and 21 of deflector plate 12 and can partially enclose side edges 23 and 25 of deflector plate 12. Support body 18 is also contoured to cooperatively receptively correspond to the contour of deflector plate 12. The deflector plate 12 may be placed vertically downward into slot 36 which vertically receives and releasably retains the same until deflector plate 12 is removed vertically upward from slot 36. When placed into slot 36, the deflection plate is orientated to expose deflection surfaces 14 and 16.

Support body 18 includes a central plate 42 having a left side portion 44 and a right side portion 46 laterally bordered by panel sections 48 and 50 respectively. The front surface 52 of central plate 42 has at least one hole, and preferably a plurality of holes such as holes 54 and 56, through which screws, bolts, lugs, rivets, or other ties may be inserted to join the deflector plate support 10 to clevis flipper assembly 58. FIG. 1 illustrates screws 60 cooperative with holes 54 and 56 of the deflector plate support and holes 62 and 64 of clevis flipper assembly 58. Clevis flipper assembly 58 is connected to an operative piston arm (not shown) capable of moving deflection plate support 10 and deflector plate 12 to an open or interception position with respect to a molten glass gob path. Central plate 42 preferably has a bottom ledge 66 outwardly extending from its bottom end 68 to support the bottom edge 70 of deflector plate 12.

Integral with and extending laterally outward from the left side portion 44 and the right side portion 46 of central plate 42 are panel sections 48 and 50 respectively which each terminate in the means for receiving, releasably retaining, and orientating deflector plate 12. Each of the panel sections 48 and 50 preferably has a plurality of hollows 72 and 74 which form vertical I-beams 76 and 78 respectively. In the event deflector plate 12 breaks during usage in its extreme temperature environment, I-beams 76 and 78 will serve as a temporary deflection surface to redirect molten glass gobs away from its parison mold path for collection and recycling.

Figure 2:
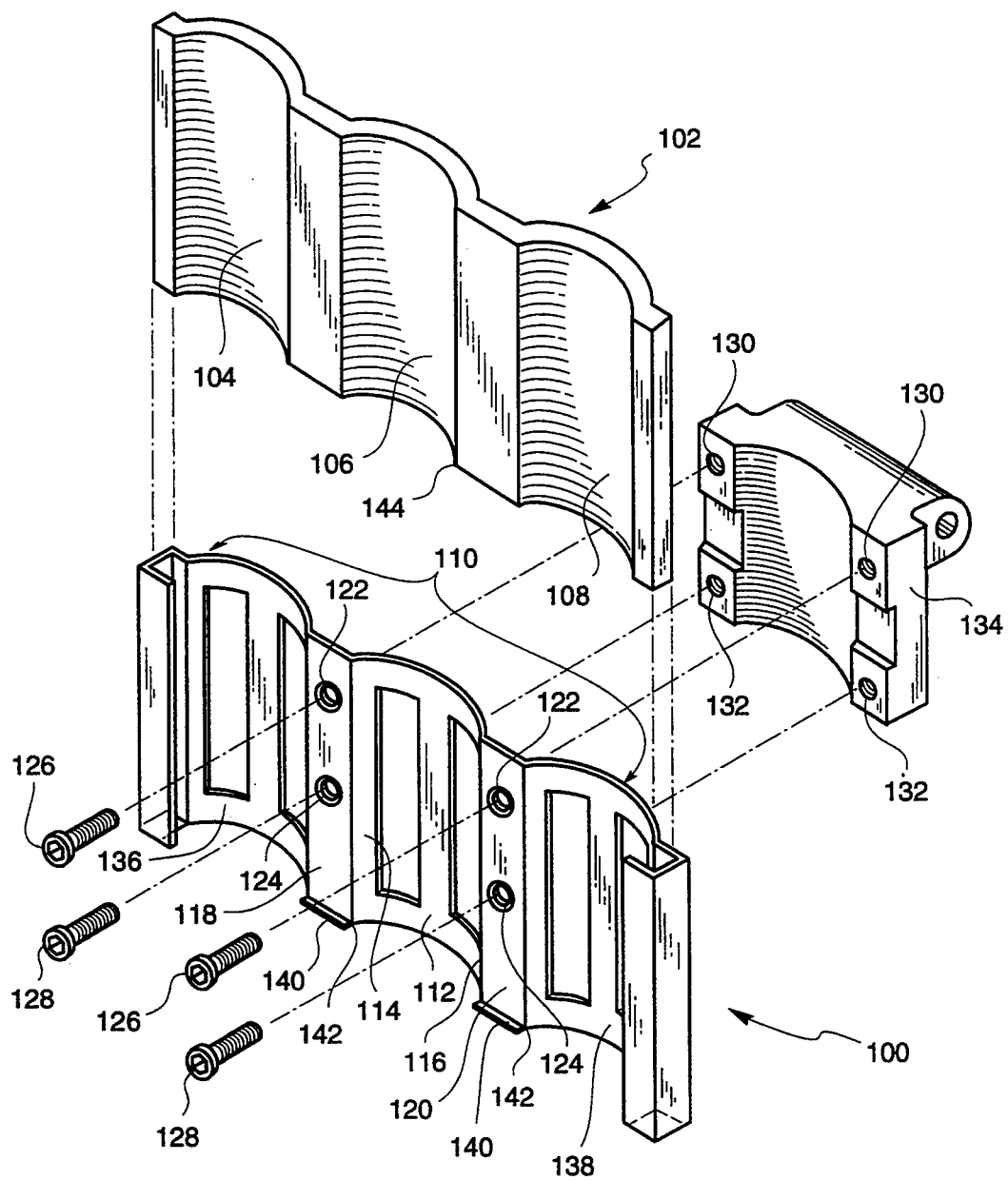
FIG. 2 is a front perspective view of another deflector plate support constructed according to the teachings of the present invention suitable for a triple gob deflector plate.

In FIG. 2 there is shown a deflector plate support 100 similar to that illustrated in FIG. 1 but now suited for receiving, releasably retaining and properly orientating a triple gob deflector plate 102 which has three molten glass gob receiving front deflection surfaces 104, 106, and 108 accommodating three molten glass gob paths.

Support body 110 of deflector plate support 100 has a central panel section 112 having a left side portion 114 and a right side portion 116 which are integral with plate surfaces 118 and 120, respectively, laterally extending therefrom. Each of the plate surfaces 118 and 120 has a plurality of holes 122 and 124, such that screws 126 and 128 may be inserted therethrough and into clevis holes 130 and 132 of an operative dual clevis flipper assembly 134. Plate surfaces 118 and 120 are integral with outer panel sections 136 and 138, respectively, laterally extending therefrom. Each of the outer panel sections 136 and 138 are interconnected with the means for vertically receiving, releasably retaining, and orientating the triple gob deflector plate 102 as heretofore described relative to FIG. 1.

Plate surfaces 118 and 120 are each preferably provided with a bottom ledge 140 outwardly extending from their bottom end 142 to support the bottom edge 144 of the deflector plate 102.

The deflector plate support of the present invention has a number of advantages, some of which have been described above and others of which are inherent in the system.

Additionally, modifications and changes may be made in the form, construction, and the arrangement of the parts of the present invention without departing from the spirit and scope thereof. For example, the means for receiving, releasably retaining, and orientating the deflector plate within the deflector plate support of the present invention may embody support body, border, inwardly extending wall, and base formations arranged at top and bottom edges of the support body to define, in association with the support body, a slot for horizontally receiving and releasably retaining, and orientating the deflector plate. Further, the support body of the present invention could comprise a solid plate, a plate having various hollows, a contoured plate, and other structure. Accordingly, the scope of the invention is only to be limited as necessitated by the accompanying claims.

We claim:

1. A support for a deflector plate having one front deflection surface or a plurality of front deflection surfaces bordered by a first side edge and a second side edge wherein said support comprises a support body having a first end portion and a second end portion, means interconnected with said end portions of said support body structurally independent of said deflector plate and capable of partially enclosing said first side edge and second side edge of said deflector plate for receiving, releasably retaining, and orientating said deflector plate to substantially expose its front deflection surface or surfaces, and means for mounting said support body to an operative flipper assembly.

2. The deflector plate support of claim 1 wherein said means for receiving, releasably retaining, and orientating said deflector plate comprises each of the first and second end portions of said support body having a border, an inwardly extending wall, and a base, said border being connected to and disposed perpendicular to said end portion, said inwardly extending wall being connected to and disposed perpendicular to said border, and said end portions of said support body, each border, and each inwardly extending wall being joined to said base at a common end thereof to thereby define, in association with said support body, a slot for receiving and releasably retaining, and orientating said deflector plate.

3. The deflector plate support of claim 1 wherein said support body comprises a central plate having a left side portion and a right side portion and a panel section connected to and laterally extending from each of said left side portion and right side portion of said central plate, each of said panel sections being interconnected with said means for receiving, releasably retaining, and orientating said deflector plate.

4. The deflector plate support of claim 3 further including a ledge outwardly extending from an end of said central plate to support said deflector plate.

5. The deflector plate support of claim 1 wherein said means for mounting said support body to an operative flipper assembly comprises said support body having at least one hole therethrough serving as a port for screws, rivets, lugs, pins, or bolts to be inserted therethrough and into said flipper assembly to affix said support body to said flipper assembly.

6. The deflector plate support of claim 1 wherein said support body is contoured to cooperatively correspond to the deflector plate which it supports.

7. The deflector plate support of claim 1 wherein said support body comprises a central panel section having a left side portion and a right side portion, a plate surface connected to and laterally extending from each of said left side portion and right side portion of said central panel section, and an outer panel section connected to and laterally extending from each of said plate surfaces, each of said outer panel sections being interconnected with said means for receiving, releasably retaining, and orientating said deflector plate.

8. The deflector plate support of claim 7 further including a ledge outwardly extending from an end of each of said plate surfaces to support said deflector plate.

* * * * *